United States Patent
Virkar et al.

(10) Patent No.: US 6,803,027 B1
(45) Date of Patent: Oct. 12, 2004

(54) MOLECULAR DECOMPOSITION PROCESS FOR THE SYNTHESIS OF NANOSIZE CERAMIC AND METALLIC POWDERS

(75) Inventors: Anil Vasudeo Virkar, Salt Lake City, UT (US); Sanjeevani Vidyadhar Bhide, Charlotte, NC (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 09/830,399

(22) PCT Filed: Oct. 26, 1998

(86) PCT No.: PCT/US99/24052

§ 371 (c)(1),
(2), (4) Date: Aug. 13, 2001

(87) PCT Pub. No.: WO00/24676

PCT Pub. Date: May 4, 2000

Related U.S. Application Data

(60) Provisional application No. 60/105,697, filed on Oct. 26, 1998.

(51) Int. Cl.[7] .......................... C01F 17/00; C01F 11/00; C01F 7/00; C01G 23/00; C01G 37/00
(52) U.S. Cl. .................... 423/592.1; 423/263; 423/607; 423/608; 423/610; 423/625; 423/594.17; 423/593.1; 423/600; 423/595; 423/596; 423/594.12; 423/598; 423/594.8
(58) Field of Search ............................. 423/592.1, 263, 423/607, 608, 610, 625, 594.17, 593.1, 600, 595, 596, 594.12, 598, 594.8

(56) References Cited

U.S. PATENT DOCUMENTS

| 5,252,310 A | * | 10/1993 | Recasens et al. | ............ 423/462 |
| 5,935,275 A | * | 8/1999 | Burgard et al. | ............ 23/295 R |
| 6,066,305 A | * | 5/2000 | Dugger | ........................ 423/263 |

FOREIGN PATENT DOCUMENTS

| WO | 96/34829 | * 11/1996 |

* cited by examiner

*Primary Examiner*—Steven Bos
(74) *Attorney, Agent, or Firm*—Thorpe North & Western, LLP

(57) ABSTRACT

A process is disclosed for forming a nanosize ceramic powder. A precursor ceramic material is formed of a fugitive constituent and a non-soluble constituent in a single phase. The precursor is contacted with a selective solvent (water, acid, etc.) to form a solution of the fugitive constituent in the solvent and a residue of the non-soluble constituent. The precursor is sufficiently reactive with the solvent to form the solution of the fugitive constituent in the solvent and form the nondissolved residue of the non-soluble constituent. The precursor material and the non-soluble residue are sufficiently insoluble in the solvent such that there is insufficient precursor material and non-soluble residue in solution to deposit and precipitate upon the residue of the non-soluble-constituent. The fugitive constituent is sufficiently soluble in the solvent such that the precursor reacts with the solvent to form the solution of the fugitive constituent without precipitation and deposition of fugitive constituent upon the residue of the non-soluble constituent in the form of nanosize particles. After the fugitive constituent is dissolved the selective solvent containing the fugitive constituent is removed from the residue. The residue remains in the form of a nanosize powder of the non-soluble constituent.

20 Claims, 13 Drawing Sheets

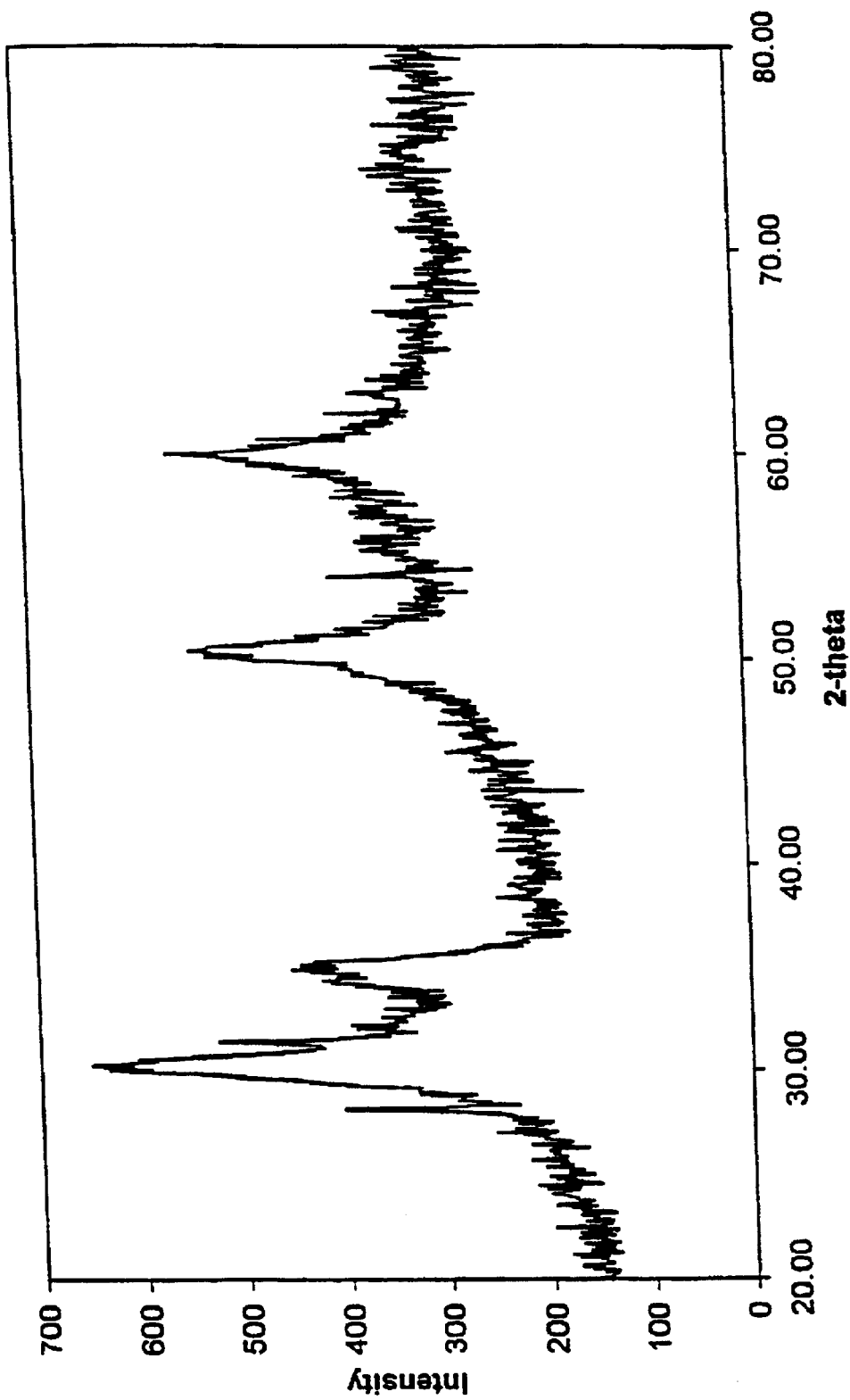
F I G. 3(f)

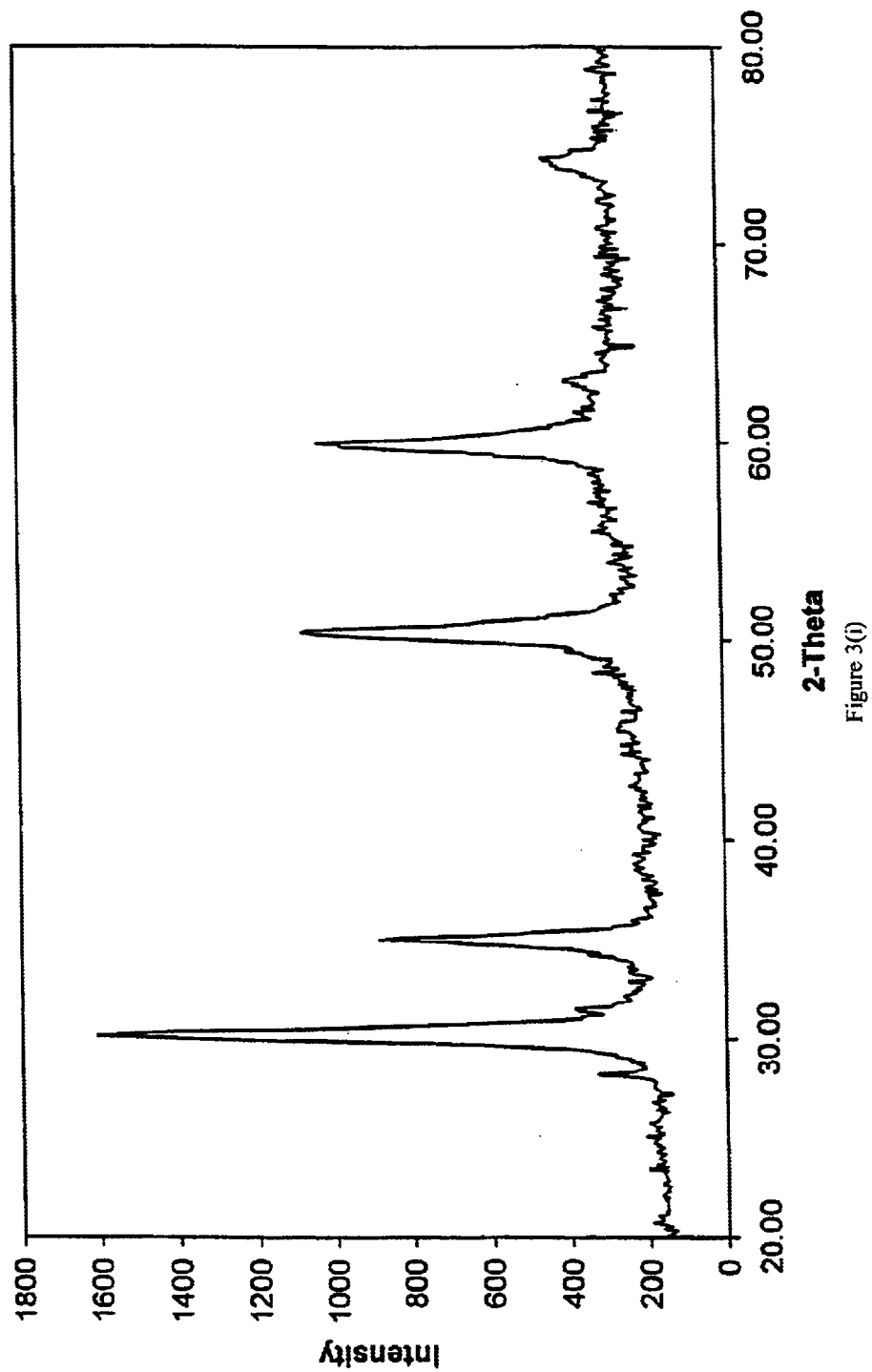

MOLECULAR DECOMPOSITION PROCESS FOR THE SYNTHESIS OF NANOSIZE CERAMIC AND METALLIC POWDERS

This application claims benefit of provisional application 60/105,697 filed Oct. 26, 1998.

STATEMENT REGARDING FEDERALLY SPONSORED RESEARCH OR DEVELOPMENT

This invention was developed in part with funding under United States Government DOE Grant DEFG039ER45661. The United States Government may have some rights to this invention.

FIELD OF THE INVENTION

This invention relates to a process for forming ceramic powders with fine nanosize particles.

BACKGROUND OF THE INVENTION

Nanosize powders are generally considered to be powders having very fine particles in the nanometer range, i.e., less than a few nanometers, e.g., 100 nanometers or less, usually 10 nanometers or less.

Nanosize powders have numerous applications such as catalysts, electrocatalysts, catalyst supports, electrodes, active powders for the fabrication of dense bodies, semiconductors for energy storage, photovoltaics, ultrafine magnetic materials for information storage, environmental clean-up as destructive adsorbents, water purification, information storage, and optical computers, to name a few. Some of the numerous examples include the following: nanosize.(3 to 4 nm) platinum for oxygen reduction in acid electrolytes, many metallic powders made by precipitation in aqueous and non-aqueous media for alloy fabrication and for catalysis, nanosize iron oxide catalyst for coal liquefaction, nanosize iron oxide particles for magnetic applications, tetragonal zirconia powder by a hydrothermal treatment at high pressures for structural applications, carbides and nitrides using non-aqueous media, nanosize $BaTiO_3$ by a gas-condensation process, etc. Many oxides have potential applications as nanosize powders. These include: $CeO_{(2-x)}$ for catalytic reduction of $SO_2$,γ-alumina as a catalyst support and for enhancing ionic conductivity of lithium iodide, $V_2O_5$ as a catalyst for $NO_x$ reduction, and etc. Several processes currently used for the synthesis of nanosize powders include:(1) Gas-phase condensation, (2) Mechanical milling, (3) Thermal crystallization, (4) Chemical precipitation, (5) Sol-gel processing, (6) Aerosol spray pyrolysis, and etc.

In gas-phase condensation, evaporation of precursors and their interaction with an inert gas leads to loss of kinetic energy, and homogeneous nucleation of nanosize powders occurs in a supersaturated vapor. Nanocrystalline powders of $TiO_2$, $Li_2O$-doped MgO, $CeO_2$, Y-doped $ZrO_2$, etc. have been produced by gas-phase condensation. Aerosol spray pyrolysis has been used to synthesize $BaFe_{12}O_{19}$, $Fe_2O_3$ among some other materials. High-energy mechanical milling is used extensively to produce nanostructured materials, especially when large quantities of materials are required. Very fine particles of nickel-aluminum alloy, Fe—Co—Ni—Si alloys, Ni—Mo alloys, for example, have been produced by mechanical milling. Contamination by the milling process, however, is a shortcoming of this process. Also, although very fine (nm size) particles can be made, agglomeration is a problem leading to cluster sizes in the micron range.

Chemical coprecipitation has received considerable attention for the synthesis of nanosize powders. Metallic as well as ceramic powders can be made by a careful control of chemistry. Alkali metal borohydride, $MBH_4$ where M is an alkali metal, for example, has been used as a reducing agent in aqueous media for the synthesis of metallic powders. Similarly, hydroorganoborates of the general formula $MH_v(BR_3)$ or $MH_v[BR_n(OR')_{3-n}]_v$ where M is an alkali or alkaline earth metal, v=1, 2, and R, R' are alkyl or aryl groups have been used as reducing and precipitating agents. It is important to control pH and ionic strength in aqueous media to prevent Ostwald ripening. In the synthesis of nanosize iron oxide, for example, it has been shown that the higher the pH and the higher the ionic strength, the smaller is the size of nanosize $Fe_3O_4$ particles.

In most methods for the synthesis of nanosize powders, two issues are particularly important; (1) the formation of fine, uniform size particles, and (2) the prevention of agglomeration. Nanoparticles of a uniform size can in principle be formed by carefully controlling nucleation and growth. Often, a variety of encapsulating methods are necessary to control the size of nanoparticles.

Agglomeration is often the result of Van der Waal's forces. The adverse effect of agglomeration on the sintering behavior of ceramic powders is well documented. Even in catalysis, the need for dispersed powders is well known. Often, supercritical drying can be used to obtain nonagglomerated powders. In liquid media, agglomeration can be suppressed through steric hindrance or through the manipulation of electrostatic interactions. The latter in polar liquids can be achieved by changing the pH and the ionic strength of the solution. Many techniques involve the use of surfactants. Often the powders which are nonagglomerated and well dispersed in a liquid, tend to agglomerate during the drying stage. Fortunately, methods such as slip-casting, gel-casting, pressure slip casting can be used to achieve powder compaction in a wet state. Such has been demonstrated using submicron ceramic powders.

With the exception of milling, all the above methods are based on molecular synthesis of nanoparticles wherein the particles are built-up by atom-by-atom, or molecule-by-molecule, addition. Even in processes based on the decomposition of metal carbonyls, the growth of particles occurs by a layer-by-layer addition of atoms. As a result, a control of nucleation and growth is necessary to ensure the formation of nanosize particles. This often requires a very precise and difficult control of the reaction system, which renders the manufacture of the nanosize powder in large quantities impractical or impossible. In addition, the molecular synthesis processes are costly because of the relatively large capital expenditures required for the equipment to control the formation of only a small quantity of nanosize product.

OBJECTS OF THE INVENTION

It is, therefore, an object of the invention to provide method for the formation of nanosize powders that is easy to implement on an industrial scale and in relatively inexpensive when compared to molecular synthesis methods.

Another object of the invention is to provide a method in which nanosize powders are formed by a process other than precipitation or deposition from solutions, thus eliminating the possibility of unwanted deposition and growth of the nanosize powders.

Another object of the invention is to provide a method which forms nanosize powders that have a reduced tendency to agglomerate.

Another object of the invention is to provide a method for the formation of nanosize powders that can be applied to forming a variety of powder compositions.

Further objects of the invention will become evident in the description below.

BRIEF SUMMARY OF THE INVENTION

In order to overcome the problems associated with molecular synthesis and milling to form nanosize powders, the present invention presents an alternative approach for the synthesis of nanosize powders. In the present invention, a precursor inorganic compound is formed from which the unwanted component is leached away so that a fine, nanosize powder is left as a residue. Thus, the present invention is based on molecular decomposition, rather than molecular synthesis, or deposition.

As discussed above, one of the problems with many methods of synthesis of nanosize powders is that often it is difficult to synthesize large quantities of materials. By contrast, the present invention is suitable for making large quantities of nanosize powders of a number of materials.

In summary, the present invention is a process for forming nanosize powders. The process comprises:

forming a precursor ceramic material comprising a fugitive constituent and a non-soluble constituent in a single phase;

contacting the precursor material a selective solvent to form a solution of the fugitive constituent and a residue of the non-soluble constituent, the precursor sufficiently reactive with the solvent to form the solution of the fugitive constituent in the solvent and the residue of the non-soluble constituent the precursor material and the non-soluble residue sufficiently insoluble in the solvent such that there is insufficient precursor material and non-soluble residue in solution to deposit and precipitate upon the residue of the non-soluble-constituent, the fugitive constituent being sufficiently soluble in the solvent such that the precursor reacts with the solvent to form a solution of the fugitive constituent without precipitation and deposition of fugitive constituent upon the residue of the non-soluble constituent in the form of nanosize particles;

removing the selective solvent solution from the residue to form a nanosize powder having the same chemical composition as the non-soluble constituent.

The precursor material should be insoluble as the precursor material in the solvent. One of the objects of the present invention is to prevent deposition or precipitation of dissolved materials upon the nanosize particles that are formed from the non-soluble residue freed of the fugitive constituent. Deposition or dissolved precursor material will not only contaminate the residue, but possibly result in particles that are too large. In the present invention, an object is to prevent, as much as possible, deposition of dissolved materials and the resulting growth of existing crystals. Unlike prior-art methods where small crystals are crystallized from solution, it is practical in the present invention to inhibit the crystallization and precipitation process altogether, as crystallization is not required to form initial nanosize crystals. Accordingly, as further illustrated below, a precursor is chosen such that precipitation of any material upon the nanosize particles is essentially avoided.

Another requirement of the precursor material is that it be reactive with the solvent. Since the precursor is insoluble, the precursor composition does not dissolve, but it does react to selectively remove the fugitive constituent, leaving a freed non-soluble constituent. The fugitive constituent is sufficiently soluble that it will not precipitate from the solution to contaminate and grow the particles of the non-soluble constitituent. The non-soluble constituent is essentially insoluble to prevent dissolved material dissolving into the solution, there thereafter precipitating upon and growing the nanosize particles of the non-soluble material formed by removal of the fugitive constituent. Basically, the invention involves a balance between preventing precursor and non-soluble constituent from forming a solution so that it cannot redeposit and grow crystals, and removing the fugitive constituent, that is sufficiently soluble in the solution that it will not precipitate from the solution to grow crystals.

For example, $BaCeO_3$ does not dissolve in water, but reacts with water to form a solution of the Ba (as $Ba(OH)_2$). On the contrary, $NaAlO_2$ is soluble in water, and cannot be used as a suitable precursor for the present invention.

In order that the non-soluble constituent freed from the fugitive constituent form nanosize particles, the precursor should be a single phase material, i.e., where the differentiation between the non-soluble and the fugitive constituents is on a molecular level. Accordingly, the precursor exists as a compound existing is the form of a large molecule, or as an alloy. For ceramics, an example of a precursor material is a mixed oxide with at least two cations, the metal oxide of the first cation being soluble to function as the fugitive constituent, and the oxide of the second being non-soluble to function as the non-soluble constituent For forming, metal nanosize powders, the precursor can exist, for example, as an alloy or an intermetallic compound.

The solvent is selected to react with the precursor and have the solubility properties as described above. For ceramics, a preferred solvent is water, but non-aqueous solvents may be required to suppress the solubilities of the non-soluble residue and/or the precursor. Usually the solvent is polar, as the fugitive constituent, which must be solubilized, is often a polar composition. Typically, suitable solvents for forming a ceramic nanosize powder are polar liquids that solubilize selected ceramic oxides, which selected oxides in the process of the invention are the fugitive constituents. As further described below, preferred solvents are water and acids. For metallic nanosize powders, the selective solvent is typically an acid that reacts with or dissolves the fugitive metal, and not the non-soluble metal. In place of acids, an acid gas such as $SO_3$, $N_2O_5$, $CO_2$ or $HCl$, may be used to react with and remove the fugitive constituent.

Any suitable process may be used for forming a precursor is contemplated.

For example, where the precursor is a mixed ceramic subjecting a powder mixture to a suitable high-temperature treatment is suitable. Precursors for metallic powders are likewise formed by any suitable process to produce a suitable alloy or intermetallic compound, such as alloying methods or powder metallurgy.

The solvent is then removed from the remaining non-soluble constituent. With the fugitive constituent removed, the non-soluble constituent assumes the form of nanosize particles. The solvent is removed by conventional methods, including, but not limited to settling, centrifugation, filtering, air drying, or a combination or the above. The solvent, may also be removed by replacing it with another liquid, such as replacing at aqueous solvent with an alcohol, and then separating the powder from the replacement liquid. Using a replacement liquid may be desirable to inhibit agglomeration of the powder during drying.

The product is chemically the same as the non-soluble constituent. The process of the invention is particularly suitable for synthesizing nanosize powders of $Al_2O_3$, $CeO_2$, $ZrO_2$, $TiO_2$, $V_2O_5$, rare earth (RE) oxide-doped $CeO_2$ and RE- or $Y_2O_3$-doped $ZrO_2$.

BRIEF DESCRIPTION OF THE DRAWINGS

FIG. 2(*c*) is an XRD trace of a comparative coarse (not nanosize) $CeO_2$ powder.

FIG. 3(*b*) is an XRD trace of the residue after boiling the $Na_2ZrO_3$ of FIG. 3(*a*) in water for 10 minutes.

FIG. 3(*c*) is an XRD trace of the residue from the boiling of $Na_2ZrO_3$ from FIG. 3(*c*) after heating in air to 100° C. for 1.5 hours.

FIG. 3(*d*) is an XRD trace of the residue after 1.5 hours in air at 200° C.

FIG. 3(*e*) is an XRD trace of the residue after 1.5 hours in air at 300° C.

FIG. 3(*f*) is an XRD trace of the residue after 1.5 hours in air at 350° C.

FIG. 3(*g*) is an XRD trace of the residue after 1.5 hours in air at 400° C.

FIG. 3(*h*) is an XRD trace of the residue after 1.5 hours in air at 500° C.

FIG. 3(*i*) is an XRD trace of the residue after 1.5 hours in air at 600° C.

DETAILED DESCRIPTION OF THE INVENTION

Synthesis of Precursor Powders

Figure 1:
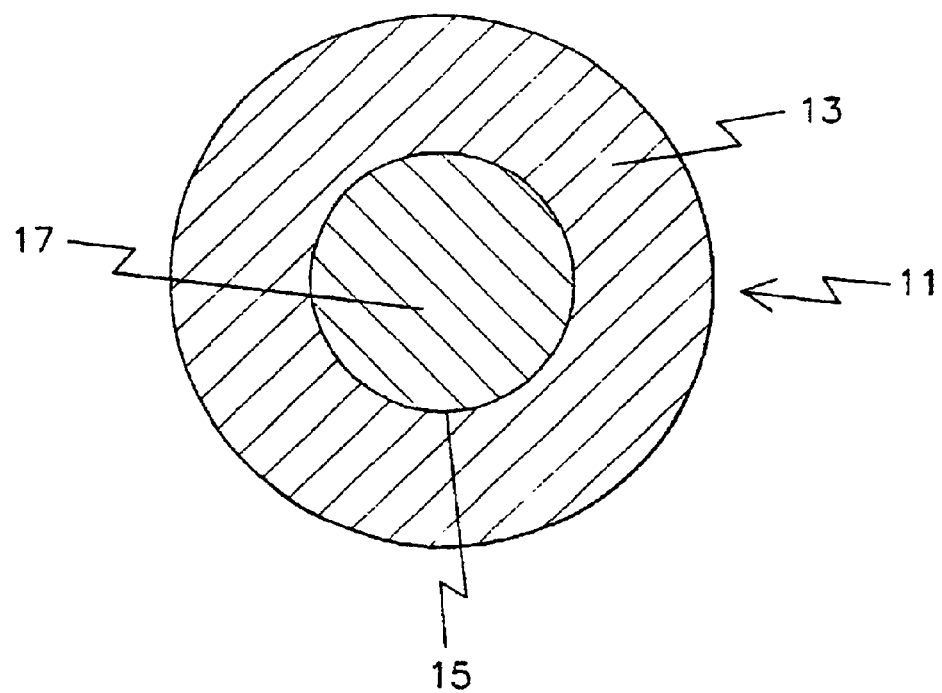
FIG. 1 is a schematic showing a reaction illustrative of the process of the invention FIG. 2(*a*) is an XRD (X-ray diffraction) trace of a single-phase perovskite precursor material (Gd-doped $BaCeO_3$).

The present invention is suitable for the synthesis of many types of powders. Although the following discussion is confined to specific materials, the applicability of the present invention to other powders will be evident to one of ordinary skill in the art. For the purposes of discussion, rare earth (RE)-doped $CeO_2$ and $Y_2O_3$-doped $ZrO_2$ are used as examples. $Y_2O_3$-doped $ZrO_2$ has many applications such as in oxygen sensors, solid oxide fuel cells, as a constituent in electrodes and in structural ceramics. RE-doped $CeO_2$ has applications in oxygen separation membranes, in fuel cells as well as in catalysis.

Respective precursor powders can be synthesized using conventional processing methods. For example, for the synthesis of nanosize $RE_2O_3$-doped $CeO_2$ by the present invention, a precursor can be $BaCe_{(1-x)}RE_xO_{(3-\delta)}$. The precursor is synthesized using $BaCO_3$, $RE_2O_3$ and $CeO_2$ in a powder form, mixing reagent powders, and calcining at 1250° C. A similar procedure can be used for other materials such as $Y_2O_3$-doped $ZrO_2$. Other examples included $BaCe_{(1-x)}RE_xO_{3-\delta}$ or $SrCe_{1-x}RE_xO_{3-\delta}$ precursors for a composition of the final nanosize powder is $Ce_{1-x}RE_xO_{2-\delta}$. or $BaZr_{1-x}RE_xO_{3-\delta}$ or $BaZr_{1-x}REXO_{3-\delta}$ precursors for a composition of the nanosize powder of $Zr_{1-x}RE_xO_{2-\delta}$ RE is a rare earth metal or Y, x is between 0 and about 0.25, and $\delta$ is between 0 and about 0.13.

Synthesis of Nanosize Powders from the Precursor

Synthesis of the nanosize powders from the precursor involves exposing the precursor to a selective solvent that leaves the desired component. The following approaches can be used be used:

(a) A reaction with water.

(b) A reaction with a dilute acid such as $HNO_3$, HCl, $H_2CO_3$, and $H_2SO_4$.

(c) A reaction with $CO_2$ and $SO_3$ in polar, non-aqueous solvents.

(a) A Reaction with Water

Water is the ideal solvent. Also, in many cases, thermodynamics of the formation of alkali hydroxides or alkaline earth hydroxides are favorable. There are, however, a few potential complications, in particular many elements form hydroxides, and there is the danger of agglomeration during the drying stage. For example, in the synthesis of $ZrO_2$ the undesired formation of $Zr(OH)_4$ is possible. However, it has been shown that with $Na_2ZrO_3$ as a precursor, a direct reaction with water can be readily effected without the formation of $Zr(OH)_4$. The potential for agglomeration can be suppressed by replacing the water with alcohol after solvation.

(b) A Reaction with Acids

In many cases, reaction with water is not favorable. For example, reaction of $BaZrO_3$ with water to form $ZrO_2$ and $Ba(OH)_2$ is not favored. However, as shown in Table B, reaction of $BaZrO_3$ with $HNO_3$ or $N_2O_5$ to form $Ba(NO_3)_2$ and $ZrO_2$ is favored. Also, $Ba(NO_3)_2$ has a reasonable solubility in water. With $HNO_3$ as a reactant, the formation of $Zr(OH)_4$ is suppressed. The tendency for agglomeration can be minimized, by either replacing water with an alcohol or other organic liquids of high vapor pressures, or drying under supercritical conditions. It is also within contemplation of the invention to use surfactants to minimize agglomeration, either based on electrostatic interactions or steric effects.

(c) Reactions with Non-aqueous Electrolytes—Reactive Gases in Polar, Non-aqueous Solvents This approach is particularly suitable when there is a tendency to form hydroxides of the product oxides which precludes the use of water when the objective is to synthesize nanosize powders with minimal agglomeration. In such cases, the use of non-aqueous, polar liquids may be necessary. Table C lists a few non-aqueous solvents, which are used for non-aqueous electrolytes. The polar liquid used as a solvent should also have a reasonable solubility for the reacting gas, which may be, for example, $CO_2$, $SO_3$, $SO_2$, or $N_2O_5$.

Suitable solvents are selected based on the following criteria: (i) the solubility of the reacting gas in the solvent, and (ii) the solubility of the fugitive compound formed; e.g. $BaCO_3$ or $BaSO_4$ in the case of $CO_2$ or $SO_3$. In order to increase contact between the precursor powder (e.g. $BaGd_xCe_{(1-x)}O_{(3-\delta)}$ x=0-0.25, $\delta$=0-0.13) and the gas ($CO_2$ or $SO_3$), the suspension of the powder is preferably agitated, e.g. by constant stirring, while the gas is bubbled through it. The solvent vapors are also preferably recovered and returned back to the reactor, by using, for example, a water-cooled condenser.

Mechanism of the Kinetics of Synthesis of Nanosize Powders

The kinetics of the formation of nanosize powders is a factor that should be considered in choosing the precursor and solvent for the desired. The data in Table B give the thermodynamic basis for the occurrence of certain given reactions. Assuming a given reaction is favored over undesired competing reactions, an important consideration is the kinetics of the reaction. With reference to the schematic of the reaction given in FIG. 1, it is readily seen that the kinetics of the reaction should depend upon the transport of soluble reactants and products. The overall reaction mechanism is expected to involve the following steps; (a) The transport of the dissolved reacting gas, e.g., $N_2O_5$, $CO_2$ or $SO_3$, (or the respective acids) through the porous layer formed to the interface separating the precursor and the product, (b) Reaction at the interface, and (c) The transport of the dissolved byproduct, e.g., $Ba(NO_3)_2$, $BaCO_3$ or $BaSO_4$, from the interface through the porous layer, into the bath. The overall kinetics may be influenced by all three of the factors, and may be dictated by whichever is the slowest step. The solubility of the reacting gas is a function of pressure; the higher the pressure, the higher is the solubility. Both the kinetics of the actual reaction occurring at the interface as well as the transport through the porous layer are functions of the concentration of the dissolved reactant species; the higher the concentration, the faster should be the kinetics. The temperature dependence of the reaction at the interface, however, will in general be different from that of the transport of dissolved species. The known theoretical models of transport through porous bodies can be used in this analysis.

Propensity for Particle Growth

The advantage of the present invention over the other methods for the synthesis of nanosize powders is that there is negligible tendency for the occurrence of particle growth by either Ostwald ripening or by precipitation. This is because neither the precursor nor the desired product, are soluble in the solvent. For example, neither $BaCeO_3$ nor $CeO_2$ is soluble in water; only the leachable $Ba(OH)_2$ is soluble in water. Since the product is nanosize, it could be argued that its solubility may be higher than bulk materials. It is known, for example, that the solubility of a sparingly soluble species is related to its size by the following equation;

$$C(r) \approx C(\infty)\exp\left[\frac{2\gamma\Omega}{rk_BT}\right]$$

where, $C(\infty)$ is the bulk solubility (particle of a large radius), $C(r)$ is the solubility of a particle of radius r, $\gamma$ is the particle-solvent interfacial energy, $\Omega$ is the molecular volume of the particle, $k_B$ is the Boltzmann constant, and T is the absolute temperature. Assuming the following values for the various parameters; particle radius, r~2 nm, interfacial energy, $\gamma$~0.5 $J/m^2$, molecular volume, $\Omega$~0.125 $nm^3$ (125 $Å^3$), and the temperature, T=350° K, then the ratio $C(r)/C(\infty)$ is about 3.6. This shows that as long as $C(\infty)$ is rather low, even for nanosize particles the solubility enhancement is not large enough to cause any Ostwald ripening. Thus, there should be negligible particle growth.

Sintering Behavior of Powders

The sintering (densification) behavior of nanosize powders synthesized by the present invention is expected to result in densification at lower temperatures, resulting in a finer microstructure.

Characterization of Sintered Bodies

The grain size of sintered bodies made from the nanosize powders should be smaller than those made from conventional ceramic powders. It is well known that very fine-grained ceramics often exhibit interesting properties, such as, for example, superplasticity at elevated temperatures, and high strength at low temperatures.

Metallic Powders

The present invention is also applicable to the synthesis of metallic powders, by the appropriate choice of the metallic precursor and the selective solvent. For example, synthesis of Pd powder can be achieved with precursor of an equimolar alloy of Ba and Pd, which is actually a line compound BaPd. The alloy can be made by arc melting or by powder metallurgy. The powdered alloy is then treated in dilute HCl to remove the Ba to form nanosize Pd.

Suitability for the Synthesis of Large Quantities of Nanosize Powders

The process of the invention for the synthesis of nanosize powders is simple, and can be adapted by using chemical leaching technology. Especially with water as the solvent, the process does not require exotic equipment nor exotic precursors. The precursors can be made by simple calcination or alloy fabrication methods. The starting particle size of the precursors need not be very small. Finally, the process has a general applicability for a wide range of materials. The process thus is easily amenable to scale up for production of large quantities of materials.

In summary, nanosize powders of a variety of materials are usually made by one or more processes which may be categorized as belonging to molecular synthesis wherein particles are built up by an atom-by-atom or a molecule-by-molecule addition on a particle nucleus. The present invention is based on molecular decomposition wherein unwanted species are chemically leached away thus producing a nanosize powder as a residue, starting with a precursor of a macroscopic size. The method of the present invention should result in nanosize particles of a uniform composition and size. In the present invention, neither the precursor nor the product is soluble in the reaction medium. As a result, particle coarsening is not expected to occur.

EXAMPLES

The following describes a general approach of the practice of the invention with two illustrative examples; namely the synthesis of nanosize $CeO_2$ and $ZrO_2$.

Example I

Synthesis of Nanosize $CeO_2$

The starting precursor may be one of the alkaline earth cerates, such as $BaCeO_3$. At room temperature, the standard free energy for the reaction

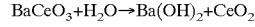

$BaCeO_3+H_2O \rightarrow Ba(OH)_2+CeO_2$ is −189.79 kJ/mol. indicating that this reaction is favored. The volume of $CeO_2$ per molecule is ~77 $Å^3$ and the linear dimension is (cube root of the volume) 4.25 Å. The volume per molecule of $BaCeO_3$ is ~85 $Å^3$ and the linear dimension is 4.4 Å. Thus, if BaO is leached out as $Ba(OH)_2$, the change in volume for the original $BaCeO_3$ is ((85−77)/85)×100 or 9.4%, or the change in linear dimension is ((4.4−4.25)/4.4)× 100 or 3.4%. FIG. 1 shows a schematic of a particle 11 reacting with $H_2O$ to form $Ba(OH)_2$. The $Ba(OH)_2$ formed dissolves into water thus leaving a porous layer 13 of $CeO_2$. The volume percent porosity in the layer is expected to be about 9.4%. The fact that $BaCeO_3$ readily reacts with water suggests that the porosity is open. This facilitates the transport of the reacting species, $H_2O$ here, to the $CeO_2$ (porous)/$BaCeO_3$ (dense) interface 15. The reaction continues until all of the $BaCeO_3$ 17 reacts to form porous $CeO_2$. The formed $CeO_2$ should be fragile and break into a fine, nanosize powder.

Figure 2:
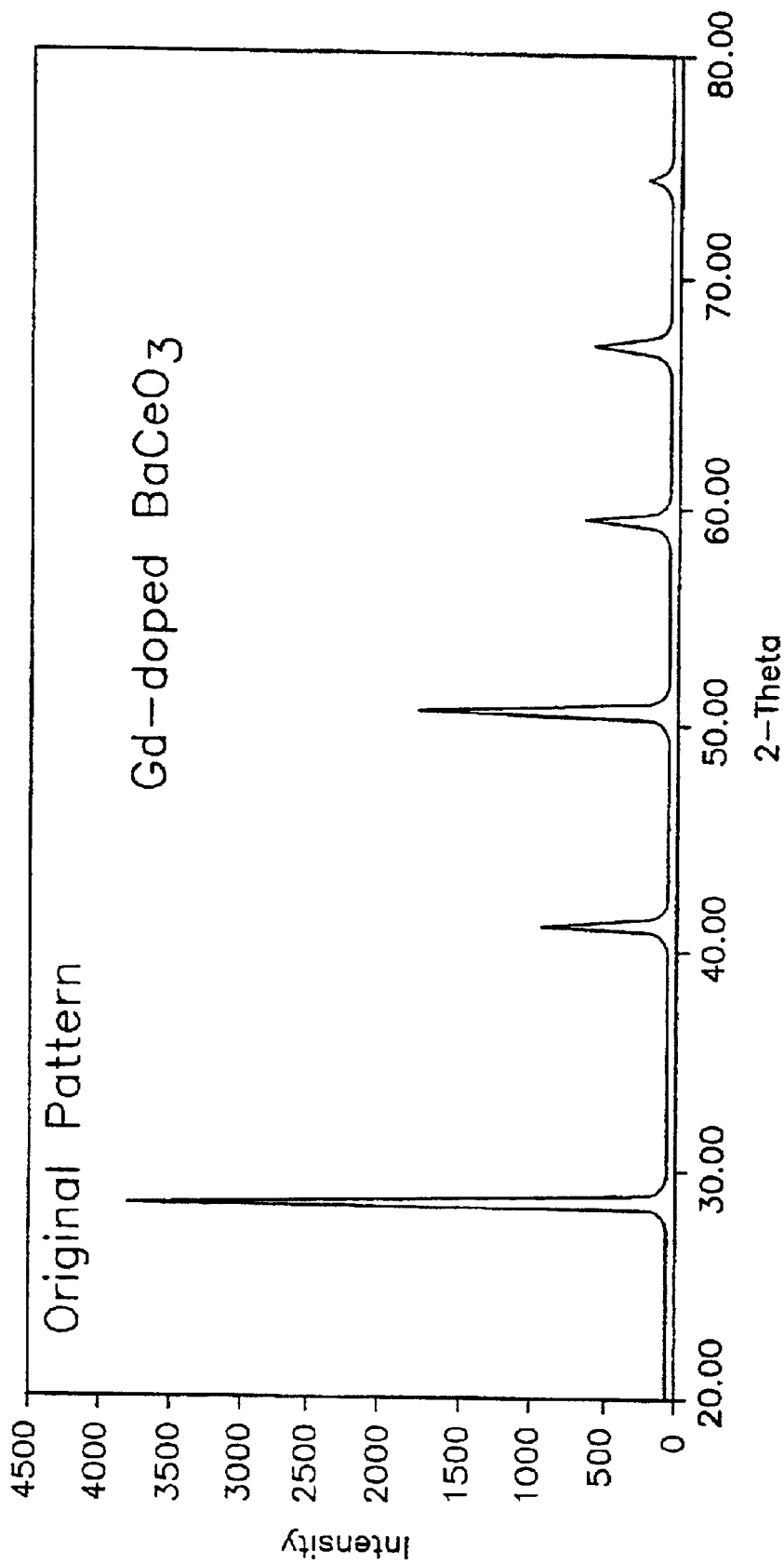
FIG. 2(*b*) is an XRD trace of the material of FIG. 2(*a*) after boiling in water for two days, showing conversion to nanosize $CeO_2$.
Figure 2:
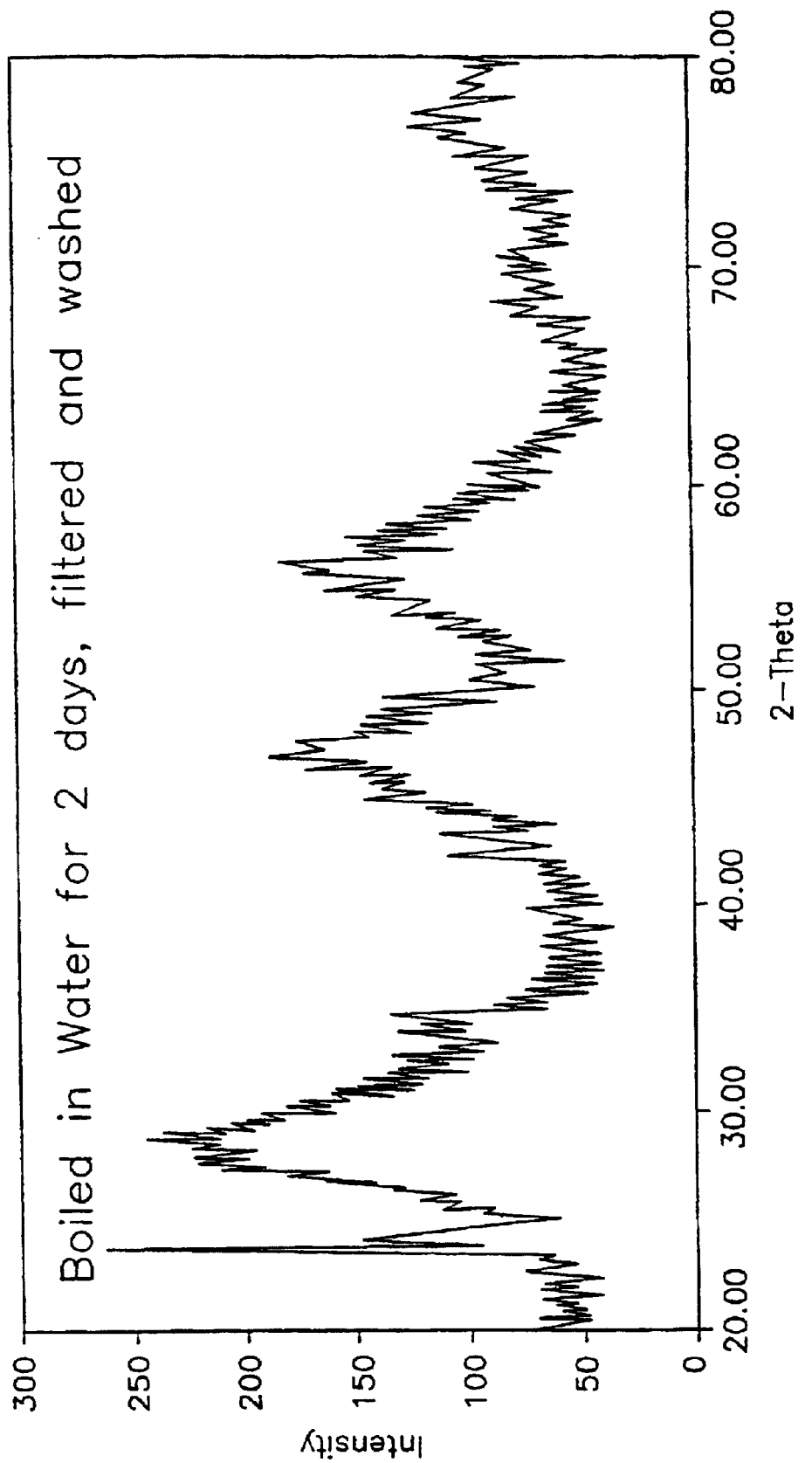
Figure 2:
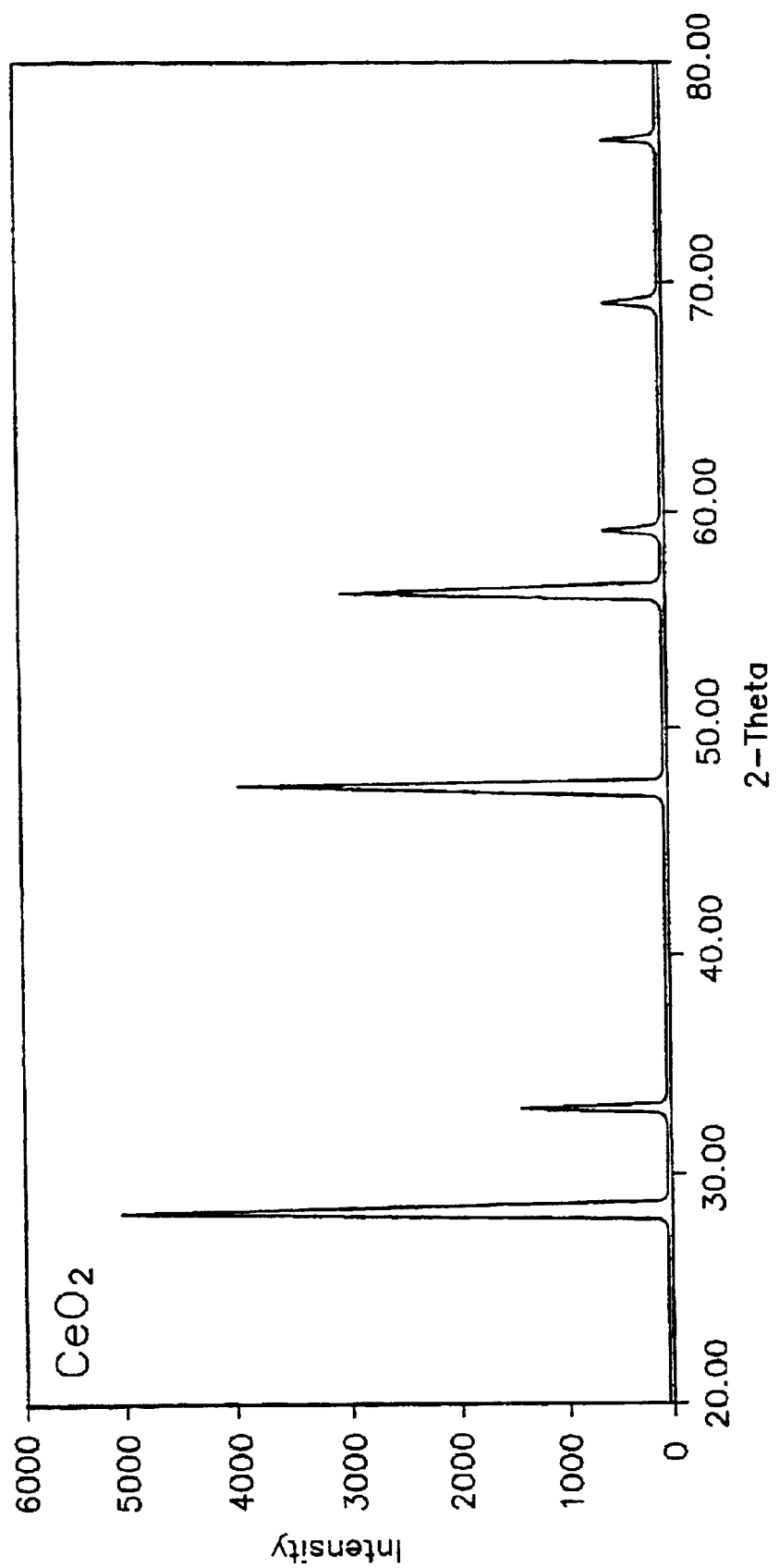

In order to verify the concept, the following preliminary experiments were done. $Gd_2O_3$-doped $BaCeO_3$ powder of composition $BaGd_{0.2}Ce_{0.8}O_{(3-\delta)}$ was synthesized using $BaCO_3$, $CeO_2$, and $Gd_2O_3$ powders. The powders were mixed in requisite proportions and wet ball-milled for 24 hrs. The well-mixed powder was then dried and calcined at 1450° C. for 6 hrs. The calcined powder was then ball-milled and examined by X-ray diffraction (XRD) with $CuK_\alpha$ radiation to ensure the existence of a single-phase perovskite (FIG. 2(a)). The calcined powder was then boiled in water for 2 days, filtered using a fine filter paper, washed with water to dissolve away $Ba(OH)_2$, dried and then examined by XRD. FIG. 2(b) shows the corresponding XRD trace. Also shown in FIG. 2(c) is an XRD trace of as-received $CeO_2$. A comparison of FIGS. 2(a) and 2(b) shows that upon boiling, $BaCeO_3$ completely decomposes. The sharp peak at ~24° is due to remnant $Ba(OH)_2$ not removed completely during washing.

A comparison of FIGS. 2(b) and 2(c) shows that the powder formed upon boiling is indeed $CeO_2$ (presumably Gd-doped). The important difference between the two is that the XRD peaks of the powder formed by boiling $BaCeO_3$ are considerably broader than for the as-received $CeO_2$ powder. Using the Scherrer formula, the particle size of the ceria formed is estimated to be ~4 nm. This shows that the method of the present invention involving molecular decomposition of starting a starting material with a larger molecule can lead to a fine, nanosize powder even when the initial powder is quite coarse.

Example II
Synthesis of Nanosize $ZrO_2$

The starting precursor may be a suitable alkali or alkaline earth zirconate. In the preliminary work, $Na_2ZrO_3$ was used as the precursor. This was simply boiled in water for a few minutes. The reaction is

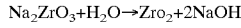

$Na_2ZrO_3 + H_2O \rightarrow Zro_2 + 2NaOH$

No thermodynamic data are available. However, preliminary experimental work, results of which are described below, shows that the above reaction is indeed favored.

Powder of $Na_3ZrO_3$ was purchased from a commercial vendor. Approximately 10 gms. of the powder was boiled in water for ten minutes. The residue was filtered, washed, and dried. The residue was subsequently examined by X-ray diffraction (XRD) with CuKα radiation. The residue was then subjected to a number of thermal treatments. The following are the results of this experiment.

Figure 3A:
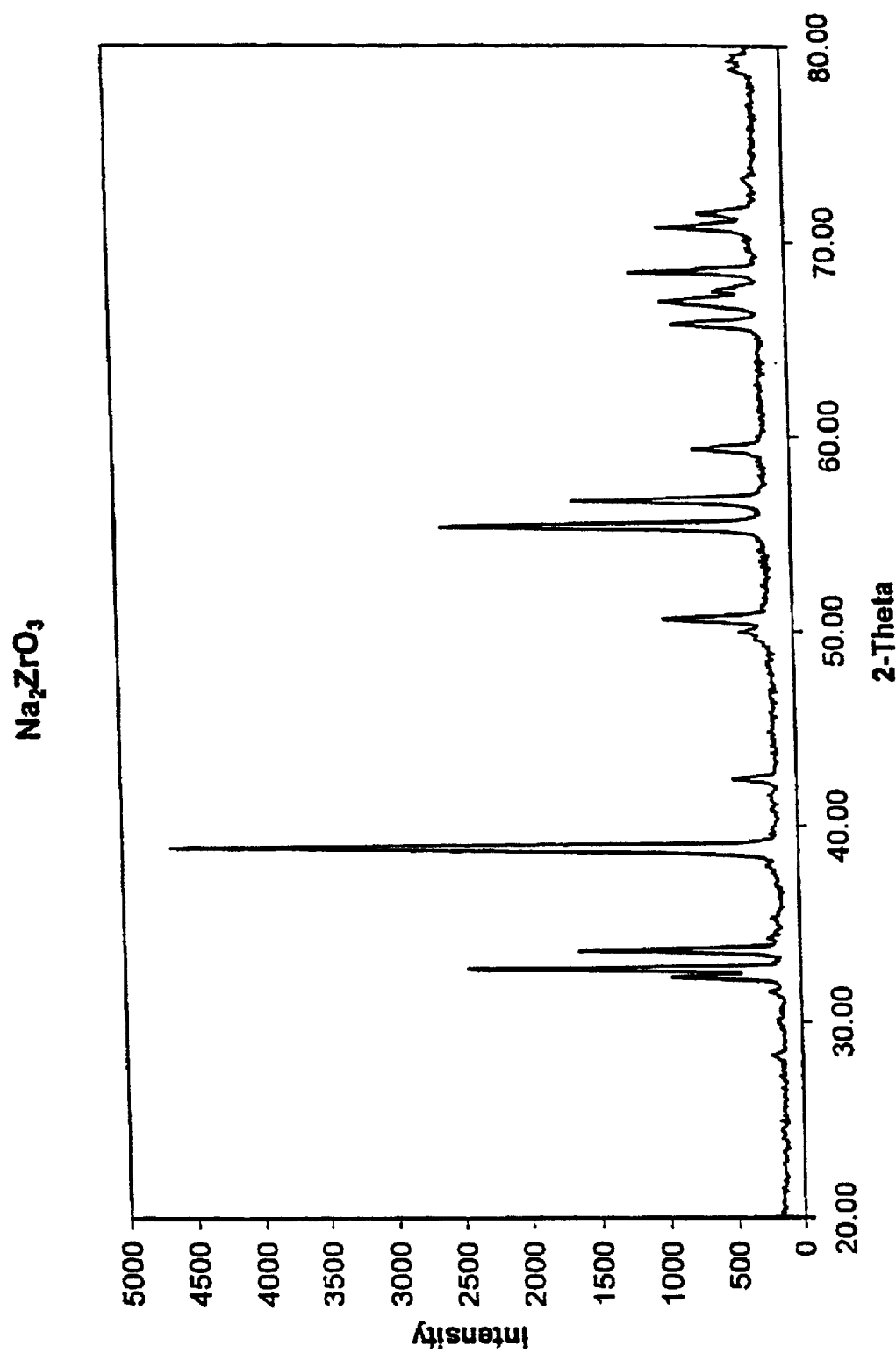
FIG. 3(*a*) is an XRD trace of an as-received, precursor (non-nanosize) $Na_2ZrO_3$ powder.

FIG. 3(a) is an XRD trace of the as-received $Na_2ZrO_3$ powder. Sharp peaks indicate a relatively coarse (at least a few tenths of a micron or more) particle size. Very tiny peaks at approximately 28 and 31.5 degrees are due to a small amount of monoclinic $ZrO_2$ that was present in the as-received $Na_2ZrO_3$ powder.

Figure 3B:
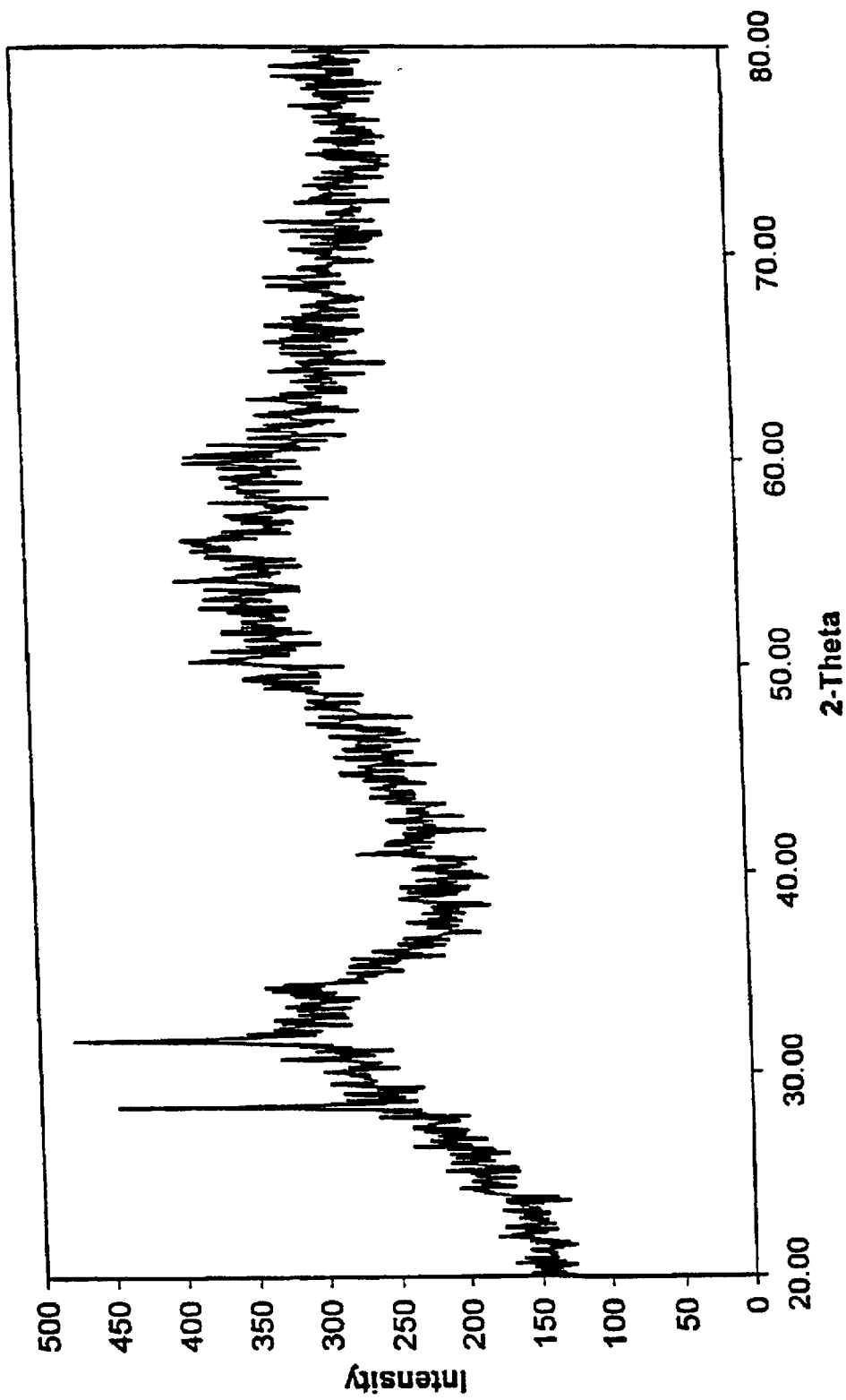

FIG. 3(b) is an XRD trace of the residue after boiling $Na_2ZrO_3$ in water for 10 minutes, washing and drying. The trace shows the absence of the original $Na_2ZrO_3$ powder. The trace mainly consists of two very broad peaks. These peaks belong to the cubic phase of $ZrO_2$. The peaks are very broad and contain more than one peak in each of the peaks. These very broad peaks are indicative of a very fine (nano) particle size. The reaction that occurred is the following:

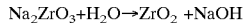

$Na_2ZrO_3 + H_2O \rightarrow ZrO_2 + NaOH$

The two sharp peaks at ~28 and ~31.5 degrees are again due to the small amount of monoclinic $ZrO_2$, present in the original $Na_2ZrO_3$ powder.

Note that the intensity scales in 3(a) and 3(b) are quite different, and that the same monoclinic peaks with about the same intensities are present in $Na_2ZrO_3$. Note also that the integrated peak intensity of the monoclinic peak is very small compared to that of the nanosize $ZrO_2$ formed (broad peaks). Some growth of the original monoclinic $ZrO_2$ particles is expected by the deposition of new $ZrO_2$ (by the above reaction) on them. These monoclinic $ZrO_2$ particles are not expected to be nanosize, consistent with observations.

Figure 3C:
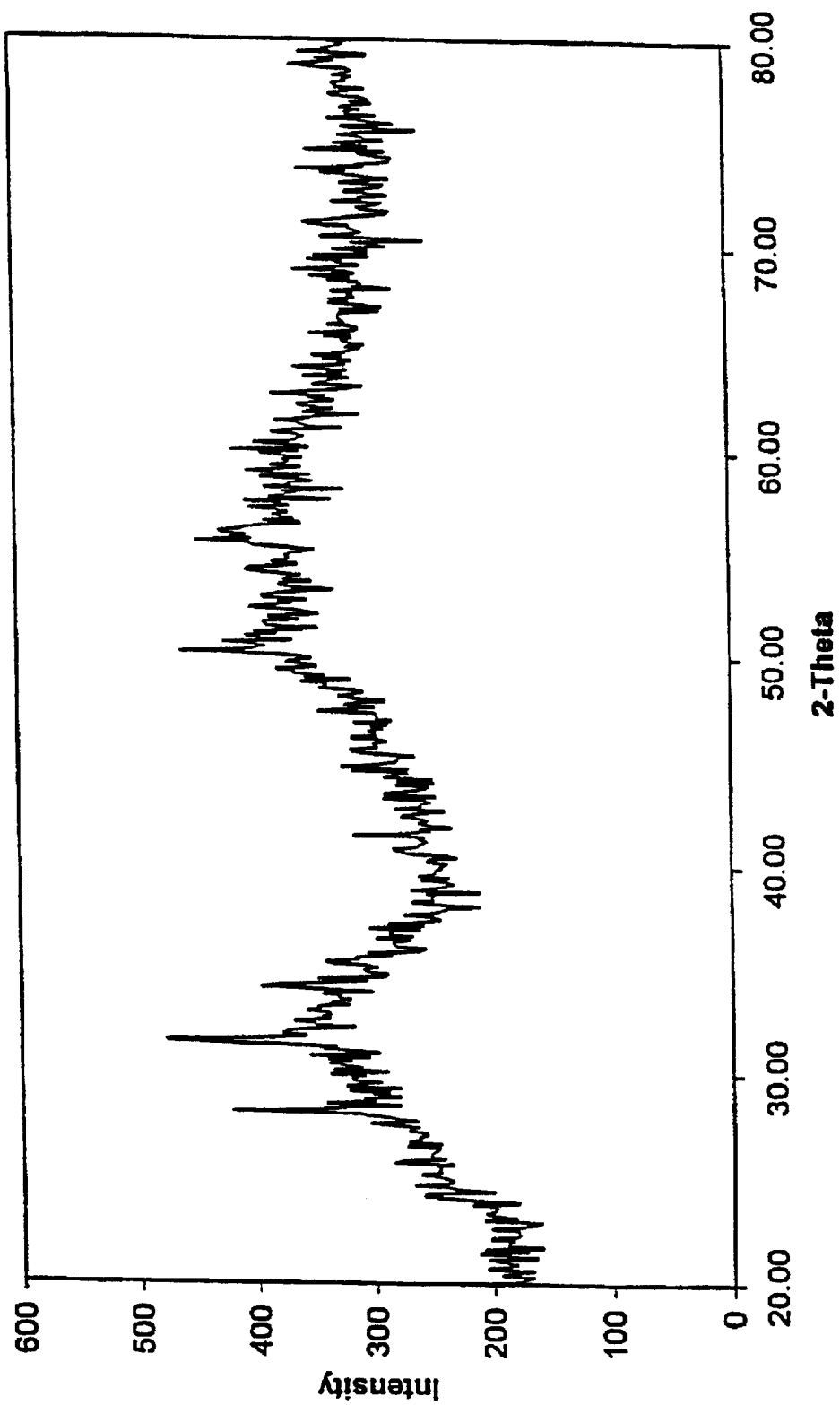

FIG. 3(c) is an XRD trace of the residue after heating in air to 100° C. for 1.5 hours. Note that the trace is similar to that in FIG. 3(b).

Figure 3D:
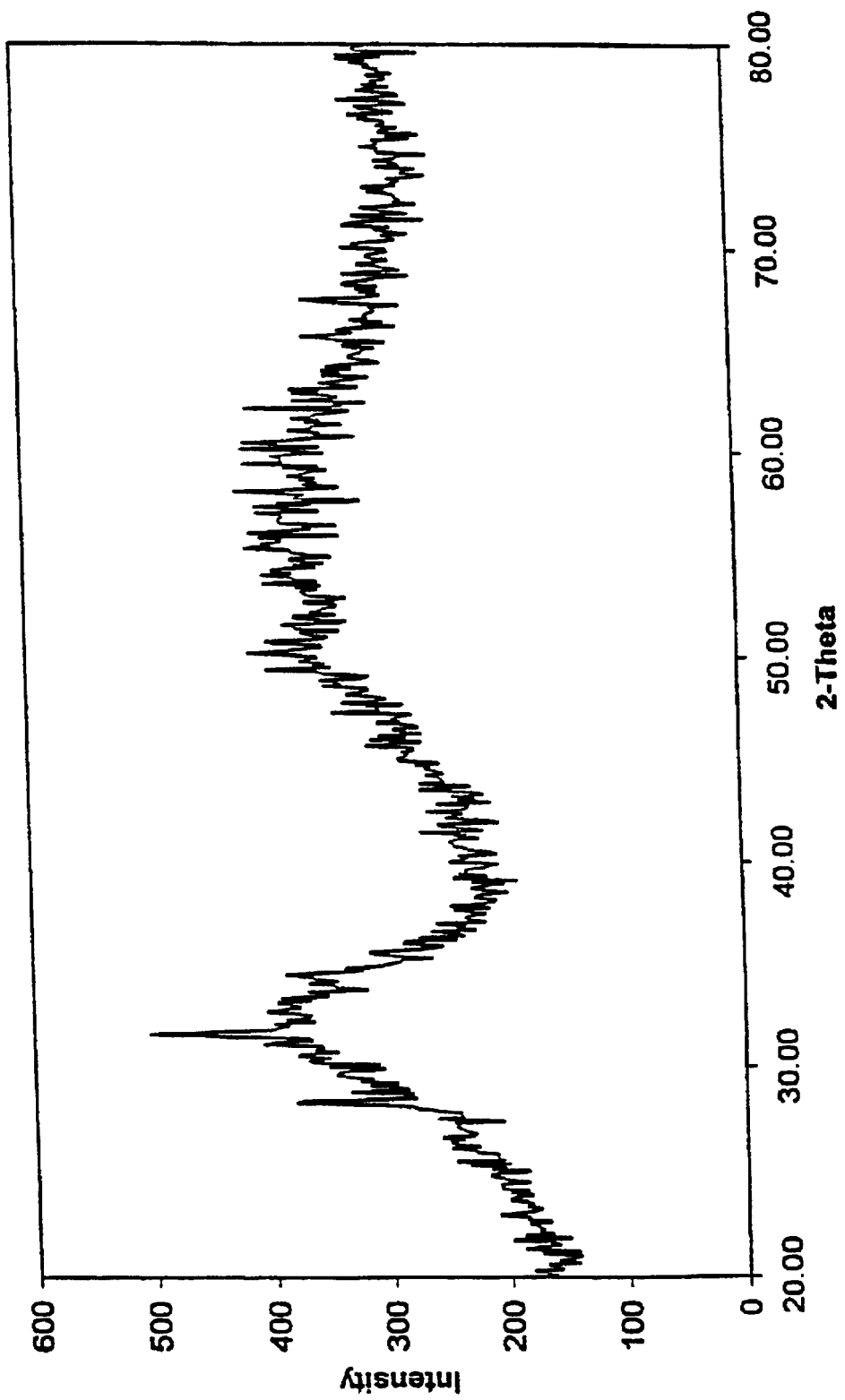

FIG. 3(d) is an XRD trace of the residue after 1.5 hours in air at 200° C. in air. The peaks have become somewhat sharper (peak widths are less in this figure as compared to that in FIGS. 3(b) and 3(c)). This is indicative of a slight coarsening of particles.

Figure 3E:
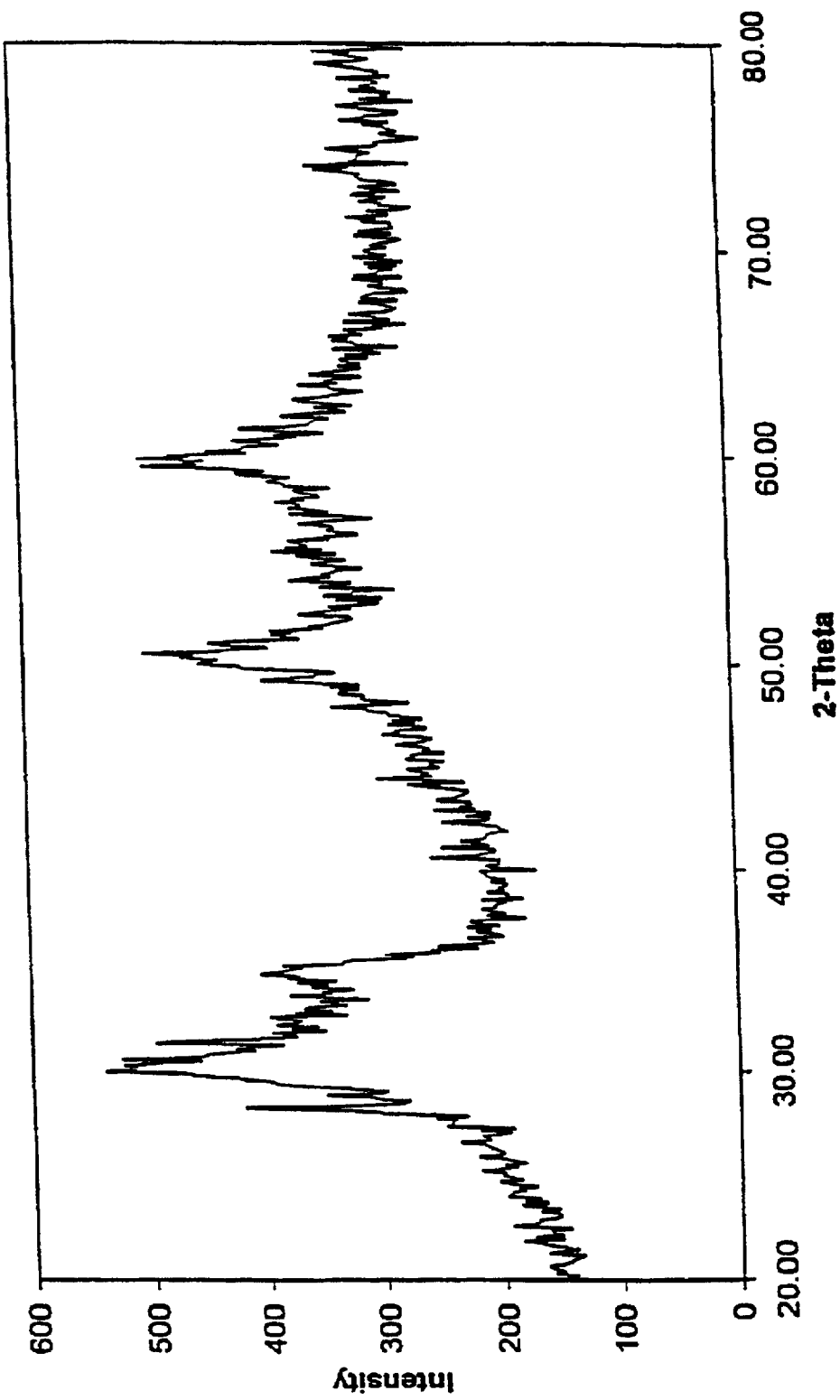

FIG. 3(e) is an XRD trace of the residue after 1.5 hours in air at 300° C. The peaks not only have become sharper but that the initial very broad peaks of the residue have now split into more peaks. A total of 4 broad peaks are apparent, in addition to the two sharp peaks corresponding to the original monoclinic $ZrO_2$. The four broad peaks are identified with cubic $ZrO_2$. The peaks correspond to (111), (200), (220), and (311) reflections, in increasing diffraction angle.

FIG. 3(f) is an XRD trace of the residue after 1.5 hours in air at 350° C. The four peaks have become slightly sharper.

Figure 3G:
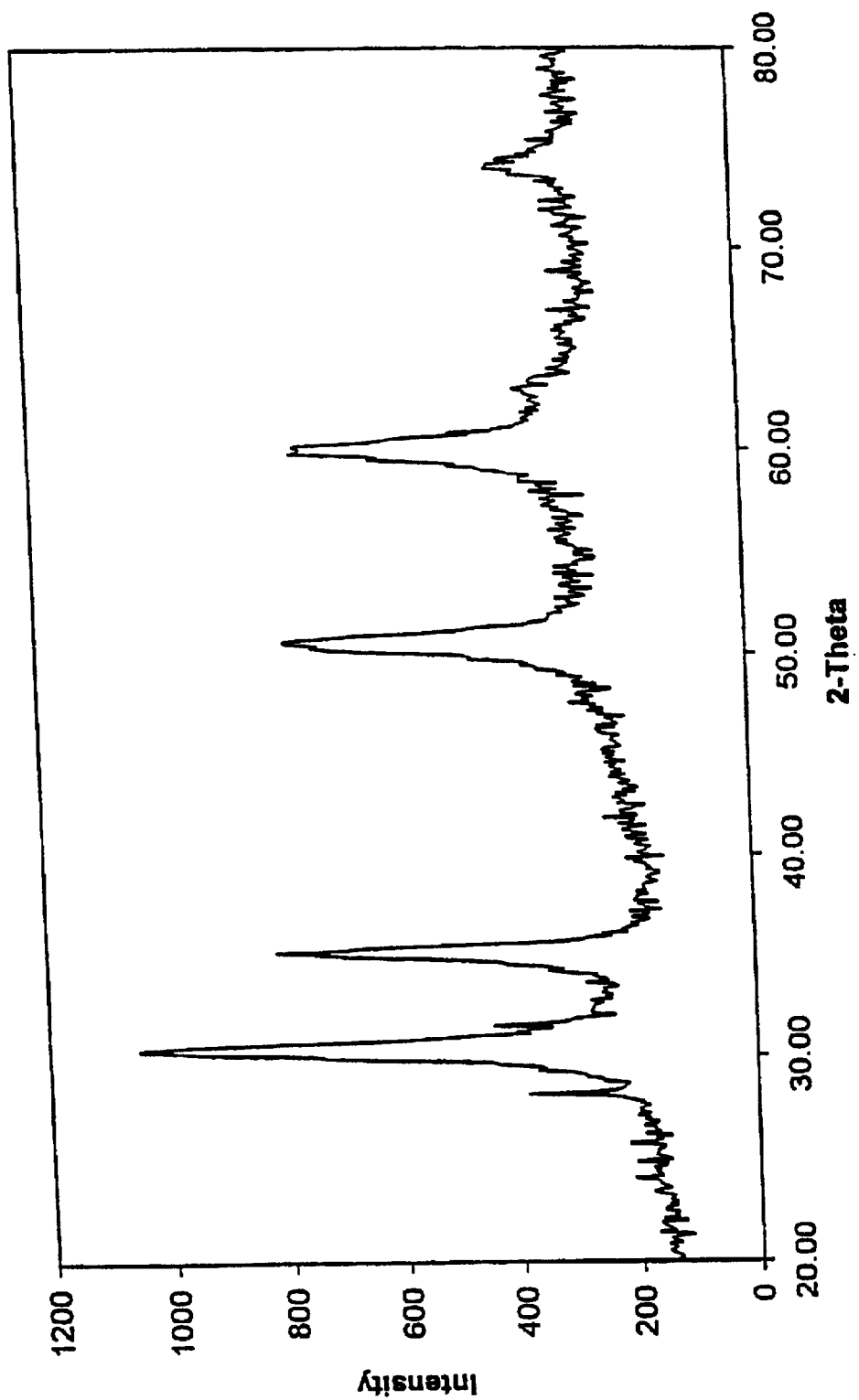

FIG. 3(g) is an XRD trace of the residue after 1.5 hours in air at 400° C. The four peaks have become even sharper.

Figure 3H:
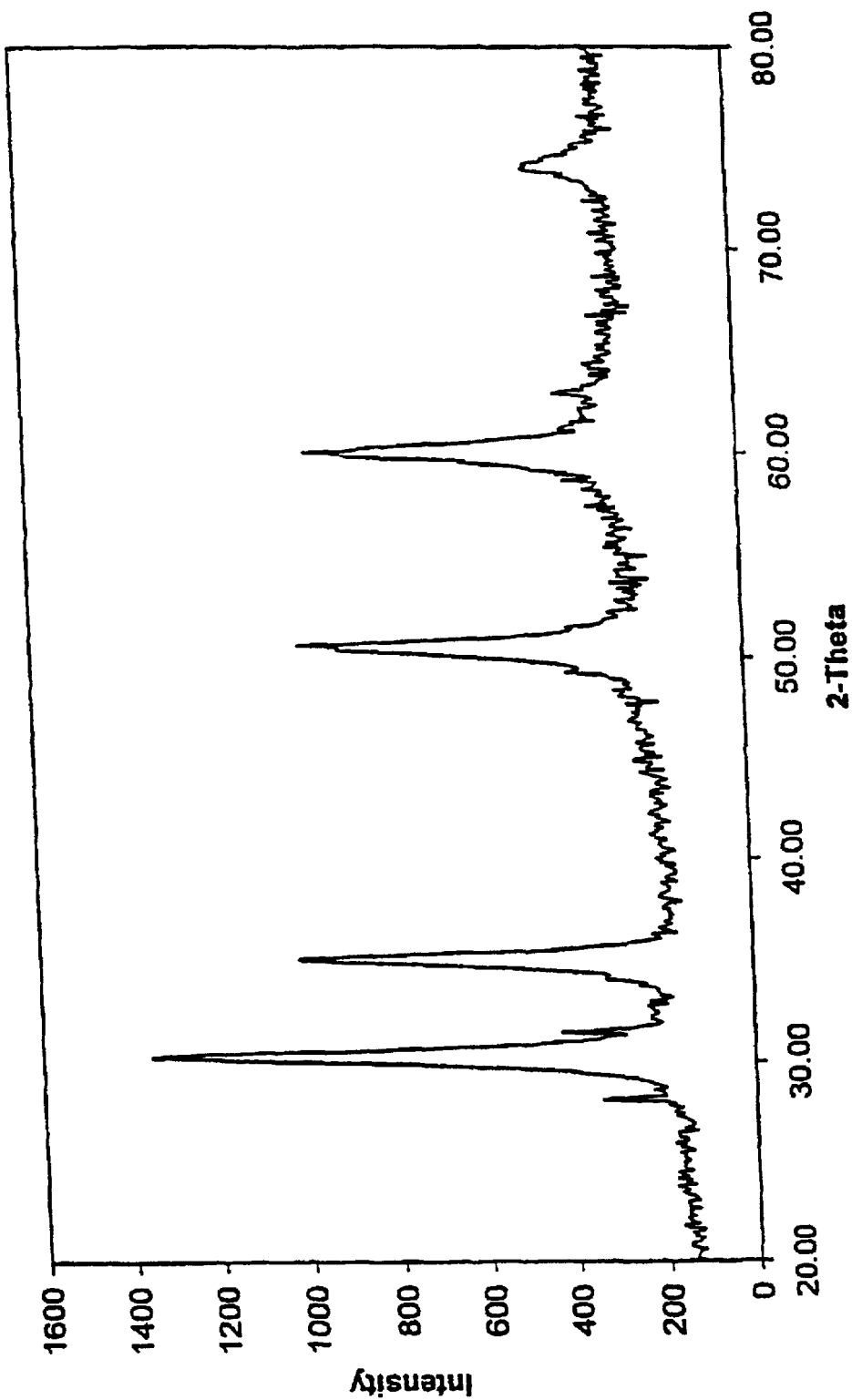

FIG. 3(h) is an XRD trace of the residue after 1.5 hours in air at 500° C.

FIG. 3(i) is an XRD trace of the residue after 1.5 hours in air at 600° C.

The corresponding XRD traces in FIGS. 3(c) to 3(i) show the formation of cubic zirconia as the residue is heated to higher temperatures. The stable phase of $Zro_2$ at low temperatures is monoclinic. The formation of a very fine (nanosize) $ZrO_2$ by the described process leads to the stabilization of cubic $ZrO_2$ due to surface energy considerations ($\gamma_{Cubic} < \gamma_{Monoclinic}$ where γ denotes surface energy of the respective polymorph). The present experiment showed that: (1) $Na_2ZrO_3$ can be used to synthesize nanosize $ZrO_2$. (2) The nanosize $ZrO_2$ formed is of cubic crystal structure. Using the Scherrer formula, which relates the particle size, d, to peak broadening, B, diffraction angle, θ, and X-ray wavelength, λ, by $$d = \frac{0.9\lambda}{B\cos\theta}$$

the particle size of the $ZrO_2$ formed as a function of subsequent heat treatment temperature was calculated. The calculated particle size as a function of thermal treatment is given in Table A.

TABLE A

Nanosize $ZrO_2$ powders produced by reaction of $Na_2ZrO_3$ with water.

| Temperature (° C.) | Corrected (111) Peak Width (rad) | Particle Size (nm) |
|---|---|---|
| 300 | 0.0476 | 3.4 |
| 350 | 0.0371 | 4.3 |
| 400 | 0.0164 | 9.8 |
| 500 | 0.0124 | 13.0 |
| 600 | 0.0113 | 14.2 |

The preceding two examples demonstrate the approach and the potential of the present invention for the synthesis of nanosize oxide powders.

The preceding shows that nanosize $CeO_2$ and $ZrO_2$ can be produced respectively by leaching out BaO from $BaCeO_3$, as $Ba(OH)_2$ and $Na_2O$ from $Na_2ZrO_3$, as NaOH. Various other reacting species can also in principle be used. As an example, let us examine the formation of $Al_2O_3$ starting with $BaAl_2O_4$ by reacting it with $HNO_3$ by the following reaction.

$$BaAl_2O_4 + 2HNO_3 \rightarrow Ba(NO_3)_2 + H_2O + Al_2O_3$$

The free energy for the above reaction at room temperature is −255.35 kJ/mol. The change in volume upon removing BaO is ~59% and the change in linear dimension is ~17%. Note that volume percent porosity in this case is much higher than for $BaCeO_3 \rightarrow CeO_2$ conversion and the reaction is expected to progress with ease. In general, the greater the amount of material that has to be leached away per unit amount of the desired final product, the finer should be the particle size. In this context, with $Ba_3Al_2O_6$ as a precursor is superior since three molecules of BaO have to be removed to form one molecule of $Al_2O_3$. The standard free energy for the reaction.

$$Ba_3Al_2O_6 + 6HNO_3 \rightarrow 3Ba(NO_3)_2 + Al_2O_3 + 3H_2O$$

at room temperature is −884.15 kJ/mol. indicating that the reaction is favored. The percent change in volume per one molecule of $Al_2O_3$ formed is greater than with $BaAl_2O_4$, implying a greater porosity, potentially faster kinetics, and a potentially finer particle size. A similar reaction can be envisioned with $H_2CO_3$ as the reactant. However, $BaCO_3$ has negligible solubility in water. With $HNO_3$ as the reactant, several reactions are possible. One such successfully conducted in our laboratory is the reaction of $MgTiO_3$ with $HNO_3$ to form $Mg(NO_3)_2$ and $TiO_2$ given by $$MgTiO_3 + 2HNO_3 \rightarrow Mg(NO_3)_2 + TiO_2 + H_2O$$

The above reaction is thermodynamically favored at room temperature. Also, $Mg(NO_3)_2$ is water soluble. Preliminary experiments were done wherein $MgTiO_3$ was boiled in dilute $HNO_3$ for 11 hours. The reaction went to completion and the resulting $TiO_2$ was indeed nanosize, as judged by XRD peak broadening. The XRD traces are not given here for the sake of brevity.

The preceding discussion was on reactions of precursor powders with $HNO_3$. It is also possible and advantageous to use $H_2SO_4$ since the magnitudes of standard free energies ($|\Delta G°|$ with $\Delta G° < 0$) of the corresponding reactions are often larger with $H_2SO_4$ than with $HNO_3$. As an example of the use of $SO_3$, consider the synthesis of $V_2O_5$, which is used as a catalyst in $NO_x$ reduction, starting with $Na_4V_2O_7$. Reaction with $SO_3$ is given by $$Na_4V_2O_7 + 2H_2SO_4 \rightarrow 2Na_2SO_4 + V_2O_5 + 2H_2O$$

with the standard free energy at room temperature given by −326.4 kJ/mol.

Also, $Na_2SO_4$ is highly soluble in many polar liquids including of course water. Also, as long as $Na_4V_2O_7$ is present, $VOSO_4$ will not form.

In the preceding paragraphs, several reactions in water as a solvent are described. In some cases, the use of water as a solvent may lead to the formation of hydroxides, e.g. $Al(OH)_3$. In such cases, instead of acids, the suitable reactants may be the respective gases; e.g. $N_2O_5$ instead of $HNO_3$ and $SO_3$ instead of $H_2SO_4$, and non-aqueous, polar solvents. The advantage of using non-aqueous solvents is that there is no possibility of the formation of $Al(OH)_3$, which must be heated to remove water thus risking agglomeration and coarsening. The possible use of other solvents is discussed below. Table B gives a few of the possible reactions to form a number of oxide powders. All of the reactions are given with reactive gaseous species. Similar data can readily be given with aqueous acids as well.

TABLE B

Some examples of the synthesis of fine ceramic powders by the present invention.

| Ceramic Of Interest | Precursor | Chemical Reaction with Selective Solvent | Standard Free Energy, $\Delta G°$ (kJ/mol.) |
|---|---|---|---|
| $Al_2O_3$ | $BaAl_2O_4$ | $BaAl_2O_4 + CO_2 \rightarrow BaCO_3 + Al_2O_3$ | −113.19 |
| $Al_2O_3$ | $Ba_3Al_2O_6$ | $Ba_3Al_2O_6 + 3CO_2 \rightarrow 3BaCO_3 + Al_2O_3$ | −459.51 |
| $Al_2O_3$ | $NaAlO_2$* | $2NaAlO_2 + SO_3 \rightarrow Na_2SO_4 + Al_2O_3$ | −342.6 |
| $Cr_2O_3$ | $MgCr_2O_4$ | $MgCr_2O_4 + CO_2 \rightarrow MgCO_3 + Cr_2O_3$ | −6.93 |
| $Cr_2O_3$ | $MgCr_2O_4$ | $MgCr_2O_4 + SO_3 \rightarrow MgSO_4 + Cr_2O_3$ | −188.13 |
| $ZrO_2$ | $BaZrO_3$ | $BaZrO_3 + CO_2 \rightarrow BaCO_3 + ZrO_2$ | −88.33 |
| $ZrO_2$ | $BaZrO_3$ | $BaZrO_3 + SO_3 \rightarrow BaSO_4 + ZrO_2$ | −336.14 |
| $ZrO_2$ | $BaZrO_3$ | $BaZrO_3 + N_2O_5 \rightarrow Ba(NO_3)_2 + ZrO_2$ | −260.3 |
| $TiO_2$ | $MgTiO_3$ | $MgTiO_3 + 2HNO_3 \rightarrow Mg(NO_3)_2 + TiO_2 + H_2O$ | −81.07 |
| $TiO_2$ | $Mg_2TiO_4$ | $Mg_2TiO_4 + 2CO_2 \rightarrow 2MgCO_3 + TiO_2$ | −77.34 |
| $TiO_2$ | $Mg_2TiO_4$ | $Mg_2TiO_4 + 2SO_3 \rightarrow 2MgSO_4 + TiO_2$ | −440.82 |
| $TiO_2$ | $Na_2TiO_3$ | $Na_2TiO_3 + CO_2 \rightarrow Na_2CO_3 + TiO_2$ | −80.62 |
| $TiO_2$ | $Na_2TiO_3$ | $Na_2TiO_3 + SO_3 \rightarrow Na_2SO_4 + TiO_2$ | −325.81 |
| $V_2O_5$ | $Na_4V_2O_7$ | $Na_4V_2O_7 + SO_3 \rightarrow 2Na_2SO_4 + V_2O_5$ | −458.01 |

*Standard free energy for $3Na_2SO_4 + Al_2O_3 \rightarrow 3Na_2O + Al_2(SO_4)_3$ at 298 K is +1,155 kJ/mol. showing that the formation of $Na_2SO_4$ is favored over that of $Al_2(SO_4)_3$. Thus, reaction of $NaAlO_2$ with $SO_3$ should proceed as shown. Also, while this reaction can be effected in water, a preferred is to identify a solvent with a high solubility for $Na_2SO_4$ but negligible for $NaAlO_2$. This is because of the possible formation of alumina precipitate which would tend to grow the particles. The formation of alumina using an aqueous solution of $NaAlO_2$ would be the conventional chemical precipitation process, and it is anticipated that in such a case a careful control of parameters would be necessary to prevent particle growth.

Table B shows that the standard free energies of the reactions are all negative suggesting that all of these reactions are thermodynamically favored. Carbonates, sulfates or nitrates of Al, Ti, and Zr are less stable than the corresponding alkaline earth compounds. No thermodynamic data appear to be available for the former.

Non-aqueous Solvents

Reactions of the various oxides with $CO_2$, $N_2O_5$, and $SO_3$ to respectively form carbonates, nitrates, and sulfates can in principle be carried out in water or other polar liquids. $Ba(NO_3)_2$ is soluble in water, but $BaCO_3$ and $BaSO_4$ are essentially insoluble. There are a number of nonaqueous, polar liquids as possible candidates. The prospective solvent to be used must have the following characteristics: (1) It must have a reasonable solubility for the reacting gases, namely, $CO_2$, $SO_3$ or $N_2O_5$. (2) It must have a significant solubility for $BaCO_3$, $BaSO_4$ or $Ba(NO_3)_2$. Table C gives a list of possible candidates and their physical properties. It is important to note that the boiling points of these liquids are quite high. Thus, as long as the solvent does not chemically react with either the precursor or the product, the process can be carried out over a wide temperature range. Also, the solubilities of $BaCO_3$, $BaSO_4$ and $Ba(NO_3)_2$ should be greater at higher temperatures. At the same time, however, the solubilities of the reacting gases in liquids decreases with an increasing temperature. Thus, a suitable optimum temperature must be identified at which the reaction rate is maximum.

TABLE C

Physical properties of some nonaqueous, polar liquids.

| Material | Formula | b.p. (° C.) | m.p. (° C.) | Viscosity (millipois) | Dielectric Constant | Density (g/ml) |
|---|---|---|---|---|---|---|
| Formamide | $HCONH_2$ | 210.7 | 2.55 | 39.7 at 20° C. | 111.5 at 20° C. | 1.135 at 18° C. |
| N-Methyl-acetamide | $CH_3CONHCH_3$ | | | 24.13 at 50° C. | 151.8 at 50° C. | 0.9336 at 50° C. |
| N-Methyl-formamide | $HCONHCH_3$ | 180 | −5.4 | 19.9 at 15° C. | 200.1 at 15° C. | 1.007 at 15° C. |
| N-Methyl-propionamide | $C_2H_5CONHCH_3$ | | | 60.6 at 20° C. | 185 at 20° C. | 0.9347 |
| Propylene Carbonate | | 241 | −49 | 25.3 | 64.4 | 1.19 |
| Ethylene Carbonate | $(CH_2O)_2CO$ | 248 | 39 | 18.5 | 89.6 at 40° C. | 1.3218 at 39° C. |

The method of the present invention can also be used to synthesize doped powders. For example, if the desired powder is $Y_2O_3$-doped $ZrO_2$ of composition $Zr_{(1-x)}Y_xO_{(2-\delta)}$, then the starting precursor could be $BaZr_{(1-x)}Y_xO_{(3\lambda)}$. After reaction with $HNO_3$, as an example, the resulting powder should be $Zr_{(1-x)}Y_xO_{(2\delta)}$. Another example is RE-doped $CeO_2$, where RE is a rare earth, namely $Ce_{(1-x)}RE_xO_{(2\delta)}$, which can be made using doped $BaCeO_3$, that is, $BaCe_{(1-x)}RE_xO_{(3\lambda)}$. In the preliminary work, nanosize Gd-doped $CeO_2$ was synthesized.

As already discussed, the method of the present invention can be used with water as the solvent in many cases. With water as the solvent, the corresponding aqueous acids, namely $H_2CO_3$ or $H_2SO_4$ or $HNO_3$, can be used, the choice of the acid being dependent upon the solubility of the leachable compound to be formed, assuming of course that the thermodynamics are favorable. For example, the synthesis of nanosize $TiO_2$ starting with $MgTiO_3$ using $HNO_3$ has been demonstrated. Further, if the leachable compound is $Na_2SO_4$ as in the formation of $V_2O_5$ starting with $Na_4V_2O_7$, $H_2SO_4$ should be the acid. However, with barium-containing compounds, $HNO_3$ is the acid of choice. There are two potential problems with water, however. (i) There is the potential for hydroxide formation. (ii) Agglomeration has been shown to occur readily when water is present. This may be avoided by replacing water with another solvent, and/or by supercritical drying. For the synthesis of RE-doped $CeO_2$ starting with $BaCe_{(1-x)}RE_xO_{(3\lambda)}$ as a precursor, water is the ideal solvent since cerium hydroxide does not readily form. Preliminary work, discussed earlier, has indeed shown that nanosize ceria can be formed in an aqueous medium.

Example III
Synthesis of Nanosize Metallic Powders

The present invention should also be useful for the synthesis of nanosize metallic powders, provided suitable intermetallic compounds can be used as precursors. There are numerous binary and ternary intermetallic compounds which may be used as precursors. As an example, for the synthesis of nanosize Pd, a possible precursor is BaPd which is an intermetallic line compound. The possible approach would consist of first fabricating BaPd by a conventional metallurgical process and then reacting it with an acid, e.g., HCl acid. It is readily shown that the $\Delta G°$ for the reaction,

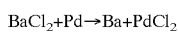

$BaCl_2 + Pd \rightarrow Ba + PdCl_2$ is positive suggesting that the first compound to form will be $BaCl_2$. The $BaCl_2$ formed will dissolve into water thus forming nanosize Pd powder. The so-formed Pd powder should be nanosize and continue to remain nanosize since Pd has a negligible solubility in water. Thus, as long as the concentration of HCl is low, and there is BaPd to react with, that is, there is Ba to react with HCl; $PdCl_2$ will not form. Note that this process differs from the synthesis of Pd by the reduction of $PdCl_2$. In the latter case, particle growth of Pd readily occurs since the deposition of Pd on the already formed Pd powder continues to occur as $PdCl_2$ in solution reacts with a reducing agent, e.g., an alkali metal borohydride. In such a case, the experimental conditions must be carefully controlled to prevent particle growth. By contrast, the process of the present invention should readily lead to the formation of nanosize Pd with negligible particle growth.

Advantages of the Method of the Present Invention over the other Synthesis Methods for Nanosize Powders 1) Uniform Mixing at a Molecular or an Atomic Level Since the powders are produced by leaching unwanted constituents from an initial homogeneous solid solution or a compound, the remaining constituents should be intimately mixed. For example, in the synthesis of $Gd_2O_3$-doped $CeO_2$ starting with $BaCe_{(1-x)}Gd_xO_{(3\delta)}$, Gd and Ce are expected to be intimately mixed since the original solid solution is uniform.

2) Narrow Particle Size Distribution

Since the constituent to be removed, e.g., Ba is distributed on a regular, periodic basis, it is anticipated that molecular level cracks or fissures are formed when Ba is removed as $Ba(OH)_2$ or $Ba(NO_3)_2$. This should lead to a uniform particle size.

3) Negligible Growth of Nanosize Particles Unlike in Conventional Chemical Synthesis The resulting nanosize particles in the present invention are essentially insoluble in the liquid media used, and so are the precursors. As a result, growth is not expected unlike conventional chemical synthesis approaches which rely on precursors reacting in solution to form an insoluble product; e.g., the formation of insoluble $Fe_3O4$ from Fe(II) and Fe(III) chlorides in solution. In such cases, growth of particles can readily occur.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A process for forming a nanosize ceramic powder comprising:

forming a precursor ceramic material comprising a fugitive constituent and a non-soluble constituent in a single phase;

decomposing the fugitive constituent to leave the non-soluble constituent by contacting the precursor ceramic material with a selective solvent to form a solution of the fugitive constituent in the solvent and a non-dissolved residue of the non-soluble constituent, the precursor ceramic material being sufficiently reactive with the solvent to form the solution of the fugitive constituent in the solvent and form the non-dissolved residue of the non-soluble constituent, the precursor ceramic material and the non-dissolved residue being sufficiently insoluble in the solvent such that there is essentially no precursor ceramic material and non-dissolved residue in the solution that will deposit and precipitate upon the residue of the non-soluble-constituent, the fugitive constituent being sufficiently soluble in the solvent such that the decomposing is without deposition or precipitation of dissolved fugitive constituent upon the residue of the non-soluble constituent, removing the solution of the fugitive constituent from the residue to form a nanosize powder of the residue of the non-soluble constituent.

2. The process as in claim 1 wherein the precursor ceramic material is $BaCe_{(1-x)}RE_xO_{3-\delta}$ or $SrCe_{1-x}RE_xO_{3-\delta}$ and the composition of the nanosize powder is $Ce_{1-x}RE_xO_{2-\delta}$ where RE is a rare earth metal or Y, x is between 0 and about 0.25, and $\delta$ is between 0 and about 0.13.

3. The process as in claim 1 wherein the precursor ceramic material is $SrZr_{1-x}RE_xO_{3-\delta}$ or $BaZr_{1-x}RE_xO_{3-\delta}$ and the composition of the nanosize powder is $Zr_{1-x}RE_xO_{2-\delta}$ where RE is a rare earth metal or Y, x is between 0 and about 0.25, and $\delta$ is between 0 and about 0.13.

4. The process as in claim 1 wherein the composition of the nanosize powder is $Al_2O_3$.

5. The process as in claim 3 wherein the precursor ceramic material is selected from the group consisting of $BaAl_2O_4$, $Ba_3Al_2O_6$, and $NaAlO_2$.

6. The process as in claim 1 wherein the composition of the nanosize powder is $Cr_2O_3$.

7. The process as in claim 6 wherein herein the precursor ceramic material is $MgCr_2O_4$.

8. The process as in claim 1 wherein the composition of the nanosize powder is $ZrO_2$.

9. The process as in claim 8 wherein the precursor ceramic material is $BaZrO_3$.

10. The process as in claim 1 wherein the composition of the nanosize powder is $TiO_2$.

11. The process as in claim 10 wherein the precursor ceramic material is $MgTiO_3$, or $Mg_2TiO_4$.

12. The process as in claim 1 wherein the composition of the non-soluble constituent and the nanosize powder is $V_2O_5$.

13. The process as in claim 12 wherein the precursor ceramic material is $Na_4V_2O_7$.

14. The process as in claim 1 wherein the selective solvent is water.

15. A process for forming a nanosize ceramic powder comprising:

forming a precursor ceramic material comprising a fugitive constituent and a non-soluble constituent in a single phase;

decomposing the fugitive constituent to leave the non-soluble constituent by contacting the precursor ceramic material with a selective solvent to form a solution of the fugitive constituent in the solvent and a non-dissolved residue of the non-soluble constituent, the precursor ceramic material being sufficiently reactive with the solvent to form the solution of the fugitive constituent in the solvent and form the non-dissolved residue of the non-soluble constituent, the precursor ceramic material and the non-dissolved residue being sufficiently insoluble in the solvent such that there is essentially no precursor ceramic material and non-dissolved residue in the solution that will deposit and precipitate upon the residue of the non-soluble-constituent, the fugitive constituent being sufficiently soluble in the solvent such that the decomposing is without deposition or precipitation of dissolved fugitive constituent upon the residue of the non-soluble constituent, removing the solution of the fugitive constituent from the residue to form a nanosize powder of the residue of the non-soluble constituent, where the selective solvent is an acid.

16. The process as in claim 15 wherein the acid is selected from the group consisting of $HNO_3$, HCl, $H_2CO_3$ and $H_2SO_4$.

17. The process as in claim 15 wherein the acid contacted with the precursor ceramic material is an acid gas.

18. The process as in claim 17 wherein the acid gas is $SO_3$, $N_2O_5$, $CO_2$ or HCl.

19. The process as in claim 1 wherein the selective solvent is a reacting gas dissolved in a non-aqueous polar solvent.

20. The process as in claim 19 wherein the polar solvent is selected from the group consisting of formamide, N-methyl-acetamide, N-Methyl-formamide, N-Methyl-propionamide, propylene carbonate, and ethylene carbonate, and the reacting gas is selected from the group consisting of $CO_2$, $SO_3$, $SO_2$ and $N_2O_5$.

* * * * *

UNITED STATES PATENT AND TRADEMARK OFFICE
CERTIFICATE OF CORRECTION

PATENT NO. : 6,803,027 B1
DATED : October 12, 2004
INVENTOR(S) : Virkar et al.

It is certified that error appears in the above-identified patent and that said Letters Patent is hereby corrected as shown below:

Title page,
Item [22], Filed, replace "Oct. 26, 1998" with -- Oct. 26, 1999. --

Signed and Sealed this

First Day of February, 2005

JON W. DUDAS
*Director of the United States Patent and Trademark Office*